US007638222B2

(12) United States Patent
Kaiser et al.

(10) Patent No.: US 7,638,222 B2
(45) Date of Patent: Dec. 29, 2009

(54) POROUS, GAS PERMEABLE LAYER SUBSTRUCTURE FOR A THIN, GAS TIGHT LAYER FOR USE AS A FUNCTIONAL COMPONENT IN HIGH TEMPERATURE FUEL CELLS

(75) Inventors: Andreas Franz-Josef Kaiser, Elgg (CH); Kaspar Honegger, Wallenwil (CH); Emad Batawi, Winterthur (CH)

(73) Assignee: Hexis AG, Winterthur (CH)

( * ) Notice: Subject to any disclaimer, the term of this patent is extended or adjusted under 35 U.S.C. 154(b) by 768 days.

(21) Appl. No.: 10/059,878

(22) Filed: Jan. 28, 2002

(65) Prior Publication Data

US 2002/0142210 A1 Oct. 3, 2002

(30) Foreign Application Priority Data

Mar. 28, 2001 (EP) .................................. 01810312

(51) Int. Cl.
*H01M 8/02* (2006.01)

(52) U.S. Cl. .......................................... 429/34; 429/36

(58) Field of Classification Search ................... 429/30, 429/34, 35, 36, 37, 38, 39, 31, 32, 241; 29/623.5
See application file for complete search history.

(56) References Cited

U.S. PATENT DOCUMENTS 3,353,998 A * 11/1967 Langguth et al. ............ 429/219
3,981,749 A * 9/1976 Fukuda et al. ................ 429/41
5,308,712 A * 5/1994 Seike et al. .................... 429/30
5,518,840 A * 5/1996 Verhoog et al. ............. 429/211
6,558,848 B1 * 5/2003 Kobayashi et al. .......... 429/241
6,632,554 B2 * 10/2003 Doshi et al. .................... 429/30

FOREIGN PATENT DOCUMENTS

EP 0510820 A2 10/1992
EP 0788175 A1 8/1997
JP 03112058 5/1991

OTHER PUBLICATIONS

Masamichi Ipponmatsu, et al.: "Solid-electrolyte fuel cell with improved cathode", *Chemical Abstracts*.

* cited by examiner

*Primary Examiner*—Patrick Ryan
*Assistant Examiner*—Monique Willis
(74) *Attorney, Agent, or Firm*—Townsend and Townsend and Crew

(57) ABSTRACT

The porous, gas permeable layer substructure (5; 5*a*, 5*b*) for a thin, gas tight layer (89) can in particular be used as a functional component in high temperature fuel cells (8). This layer substructure has a smooth surface (50*a*) which is suitable for an application of the gas tight layer or a multi-layer system including the gas tight layer, with the application being carried out by means of a screen printing method or other coating methods. The smooth surface is formed by a compacted edge zone (50). The edge zone and a carrier structure (51) adjacent to this are made from sinterable particles of a uniform substance mixture. The porosity of the carrier structure is greater than 30 volume percent, preferably greater than 40 volume percent. The pore size of the edge zone is smaller than 10 μm, preferably smaller than 3 μm.

13 Claims, 3 Drawing Sheets

POROUS, GAS PERMEABLE LAYER SUBSTRUCTURE FOR A THIN, GAS TIGHT LAYER FOR USE AS A FUNCTIONAL COMPONENT IN HIGH TEMPERATURE FUEL CELLS

BACKGROUND OF THE INVENTION

The invention relates to a porous, gas permeable layer substructure for a thin, gas tight layer. The layer substructure is provided for use as a functional component in high temperature fuel cells. The invention is also directed to an electrochemically active element for fuel cells and a method for the manufacture of the layer substructure.

Electrode reactions for the production of an electric current are carried out on electrochemically active membranes in high temperature fuel cells: namely a reducing reaction at the anode in which water or carbon dioxide are produced from hydrogen and carbon monoxide of a first gas flow; and an oxidizing reaction at the cathode, in which ionic oxygen $O^{2-}$ is formed from molecular oxygen of a second gas flow while taking up electrons from a metallic conductor. The oxygen ions move through a solid electrolyte which separates the two electrodes in a gas tight manner and which is conductive for the oxygen ions at temperatures over 700° C. The reducing anode reaction with the oxygen ions takes place while discharging electrons to a further metallic conductor which makes a connection to an adjacent electrochemically active membrane or to a battery terminal. The electromechanically active membrane is a multi-layer system in whose manufacture each layer can be used as a carrier for an adjacent layer, and this adjacent layer can be produced by means of thin film technology, for example a thermal spray method or using a screen printing method.

A high temperature fuel cell whose solid electrolyte is formed as part of a multi-layer membrane in the form of a thin layer is known from EP-A-0 788 175. Such thin film electrolytes, which are 10-20 μm thick, can be applied to a porous carrier structure by means of a VPS method (vacuum plasma spray method). The carrier structure, which has to be permeable for the reactants, is made up of a base layer with large pores and a top layer with fine pores. It forms the substructure for the further layers of the electrochemically active element. The top layer can be made of a slurry and be rolled to form a thin film by means of a tape casting method, subsequently applied to the base layer and connected thereto by sintering.

In a preferred form, the carrier structure also has an electrochemical function as an electrode and an electric function as a good conductor in addition to its mechanical function as a carrier. The material for the cathode layer can be applied to the solid electrolyte layer by means of a screen printing method and using a slurry. This material is subsequently further converted into a functional layer by sintering.

SUMMARY OF THE INVENTION

It is an object of the invention to provide a porous, gas permeable substructure for a thin, gas tight layer, for example, for the above-named purpose. Such a substructure should in particular be usable as a carrier for an electrode layer of a high temperature fuel cell.

The porous, gas permeable layer substructure for a thin, gas tight layer can be used in particular as a functional component in high temperature fuel cells. This layer substructure has a smooth surface which is suitable for an application of the gas tight layer or of a multi-layer system comprising the gas tight layer, with the application being carried out by means of a screen printing method or other coating methods. The smooth surface is formed by a compacted edge zone. The edge zone and a carrier structure adjacent to this are made from a uniform substance mixture of sinterable particles. The porosity of the carrier structure is greater than 30 volume percent, preferably greater than 40 volume percent. The pore size of the edge zone is smaller than 10 μm, preferably smaller than 3 μm.

The invention is explained in the following with reference to the drawings.

DESCRIPTION OF THE PREFERRED EMBODIMENTS

Figure 1:
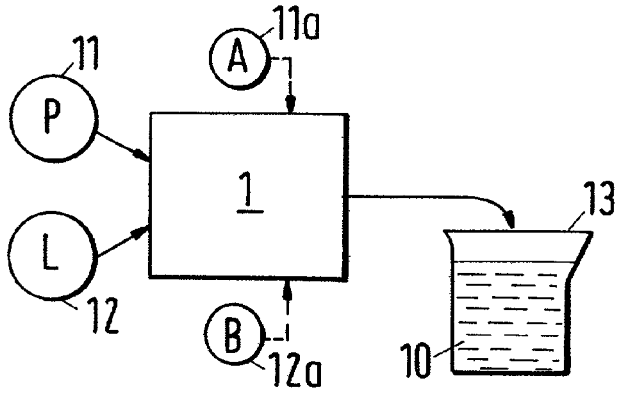
FIG. 1 shows a preparation method for a slurry which is provided for the manufacture of the layer substructure shown in schematic form.

For the manufacture of a layer substructure of the invention a slurry 10 is prepared from a powder mixture 11 containing sinterable particles and from a liquid 12: see FIG. 1. The powder mixture 11 includes, in addition to the sinterable particles, organic components which are provided as pore forming materials and as binding agents and which go into a volatile form during a sintering process in which they evaporate from the product largely free of residues. The liquid 12, which is advantageously mainly made of water, forms a suspension medium L for the particles of the powder mixtures 11 together with at least one additive. The slurry 10 is advantageously homogenized in a ball mill 1. Individual components 11*a* or 12*a* provided for the slurry can suffer losses in quality by the milling procedure. These components—in solid form A or liquid form B—are advantageously added to the mixture only towards the end of the milling procedure. A quantity required for a further method step is measured from the slurry 10 prepared in this way, in which solid particles are suspended in the liquid L using a vessel 13, which can for example be a syringe.

Figure 2:
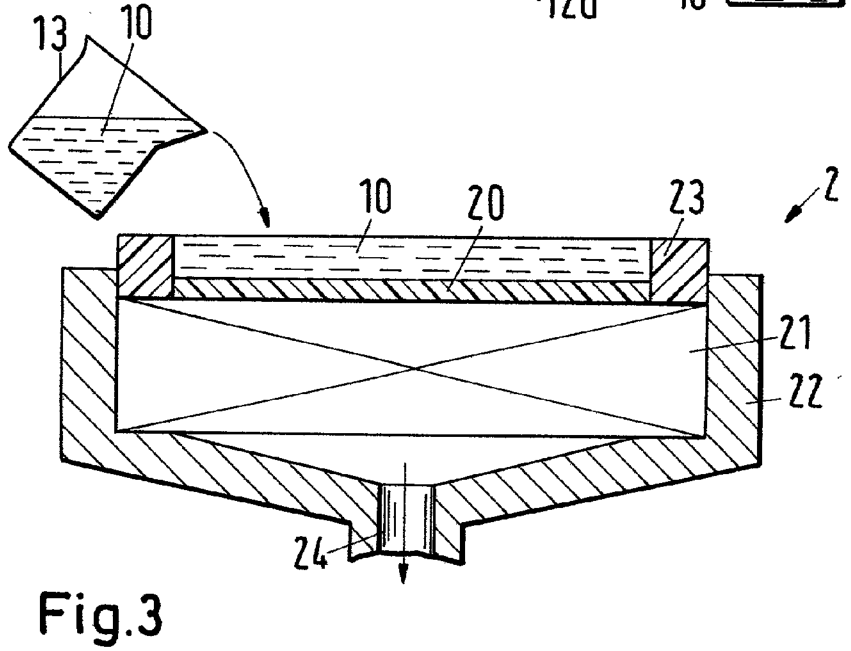
FIG. 2 shows a first mold for the method of the invention.

The further method step for the manufacture of the layer substructure of the invention is shown in FIG. 2. The slurry 10 is poured or sprayed from the vessel 13 onto a mold 2 which can absorb the liquid L and is thereby solidified into a uniformly thick layer. The mold 2 consists in the example shown of a micro-filter film 20, of a carrier structure 21, which is for example a strainer, of a wall 22 and of a frame 23, which can be made, for example, of plastic. A vacuum can be generated in the carrier structure 21 via an extraction connection 24 and the liquid L is partly extracted from the slurry 10 under the effect of the vacuum. Oriented polytetrafluorethylene can, for example, be used as the micro-filter film 20.

When pouring the slurry into the trough, which is formed by the micro-filter film 20 and the frame 23, a layer is produced which solidifies due to the extraction of the liquid L. The intermediate product produced in this way is dried, removed from the mold and finally sintered. The product is suitable as a porous, gas permeable substructure for a thin, gas tight layer. The surface separated from the micro-filter film 20 is formed as smooth; it is suitable for an application of the gas tight layer or a multi-layer system comprising the gas tight layer. The material for the gas tight layer can be applied by means of a screen printing method or other coating methods. The smooth surface is formed by a compacted edge zone. The edge zone and a carrier structure adjacent to this consist of a uniform substance mixture. The carrier structure has a pore size, that is, a medium pore diameter, which is substantially larger than the pore size of the edge zone. The porosity of the carrier structure is larger than 30 volume percent, preferably larger than 40 volume percent. The pore size of the edge zone is smaller than 10 μm, preferably smaller than 3 μm.

Figure 3:
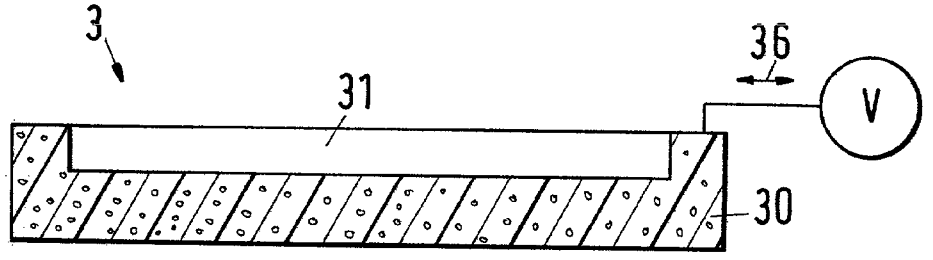
FIGS. 3, 4 show a second mold and a third mold.

The layer substructure of the invention can also be made with simpler means, namely with a mold 3 which consists of a plate 30 made of gypsum with a trough-like recess 31: see FIG. 3. Instead of gypsum, another absorbent material, for example a porous plastic, can also be used with which a mold can be made whose recess 31 has a sufficiently smooth surface. In order to spread the slurry 10 uniformly into the recess 31 and in order to promote the formation of an edge zone, the mold 3 can be connected to a vibrator 35 which acts on the mold 3, for example, by an ultrasound vibration 36.

Figure 4:
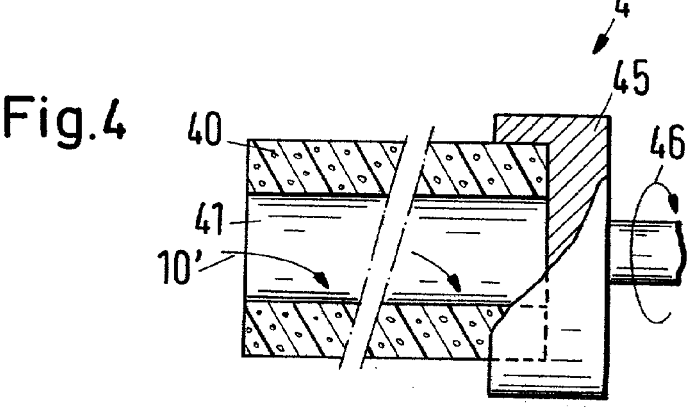

A cylindrical layer substructure can also be made with a gypsum tube 40 which can be placed onto a rotatable holder 45: see FIG. 4. The slurry 10 is injected or sprayed uniformly (arrows 10') onto the inner surface 41 of the tube lumens. The slurry is distributed uniformly due to the centrifugal force generated by a rotation 46 so that a tube with homogenous wall thickness is produced.

Figure 5:
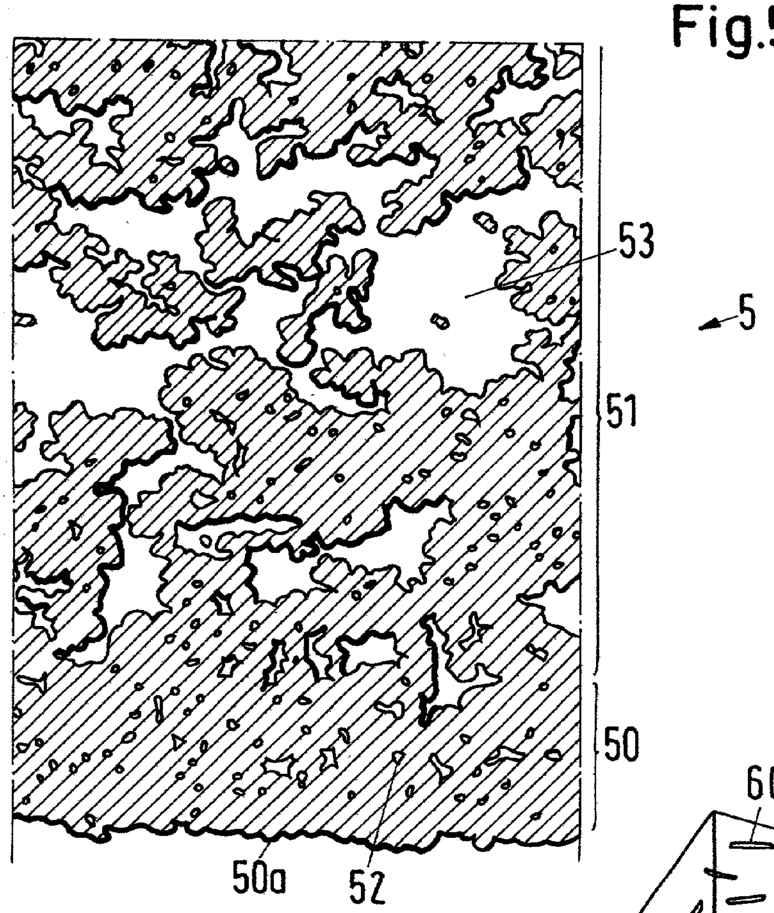
FIG. 5 is a cross-section through the product of the method of the invention, drawn in accordance with a photograph taken by means of raster electronic microscopy.

FIG. 5 shows a cross-section through a product 5 which has been made in accordance with the invention with the gypsum mold 3 of FIG. 3. It is drawn according to a photograph obtained by means of raster electron microscopy. A smooth surface 50*a* is formed by an edge zone 50 which includes small, partly closed pores 52. A carrier structure 51 adjacent to the edge zone 50 is substantially more porous. Pores 53 of the carrier structure 51 form a communicating pore space. The porosity of the edge zone 50 is less than 30 volume percent, preferably smaller than 10 volume percent. The thickness of the edge zone 50 is smaller than 100 μm, preferably smaller than 30 μm.

Figure 6:
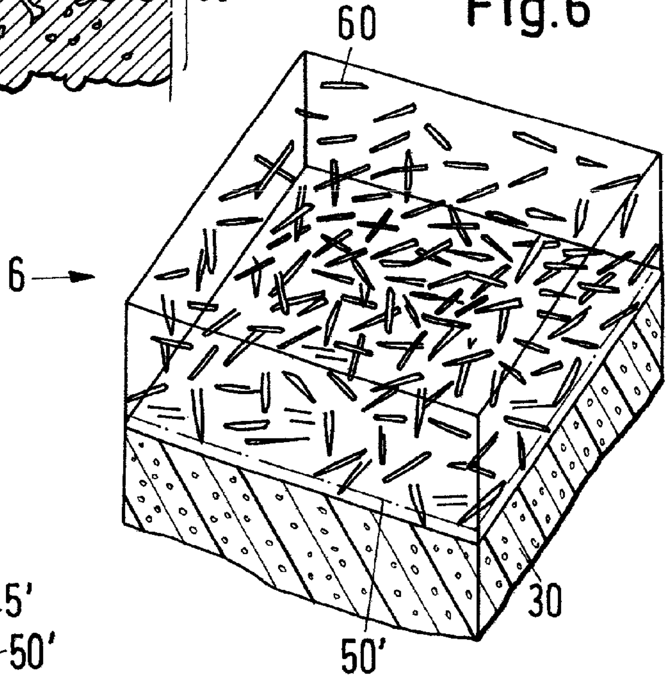
FIG. 6 is an illustration of the spatial distribution of fibers which are included in a slurry used for the method of the invention.

The large pores 53 of the carrier structure 51 have been produced by means of pore forming materials which go into a volatile form during sintering. FIG. 6 shows an illustration of the spatial distribution 6 of fibrous pore forming materials 60 which are included in a slurry 10 used for the method of the invention. An absorbent substrate 30 absorbs liquid L from the slurry 10. Fine particles of the slurry 10 are carried to the surface of the substrate 30 with the liquid L under the supporting effect of gravity where a compacted edge zone 50 is formed whose inner boundary is indicated by the chain-dotted line 50'. The fibrous pore forming materials 60 have a lower density than the sinterable particles of the powder mixture 11. The edge zone can therefore be additionally enlarged by means of a vibration (cf. FIG. 3) due to the buoyancy forces acting on the pore forming materials 60.

Figure 7:
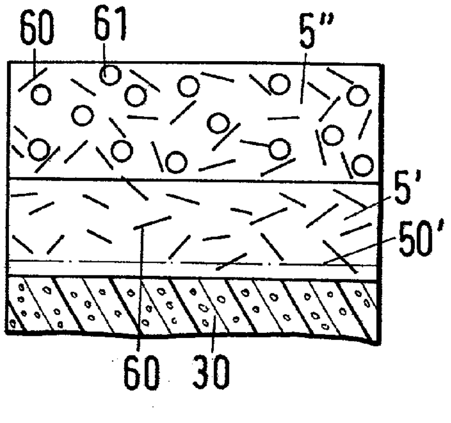
FIG. 7 is a schematic cross-section through a cast plate which comprises two layers.

FIG. 7 shows a schematically illustrated cross-section through a cast plate which comprises two layers 5', 5". A further layer 5" has been applied with a second slurry to the first layer 5' with fibrous pore forming materials 60, with spherical pore forming materials 61 also being added to the second slurry in addition to fibrous ones. A larger porosity is obtained for the second layer 5" than for the first. During sintering, the layers combine to form a coherent structure.

Figure 8:
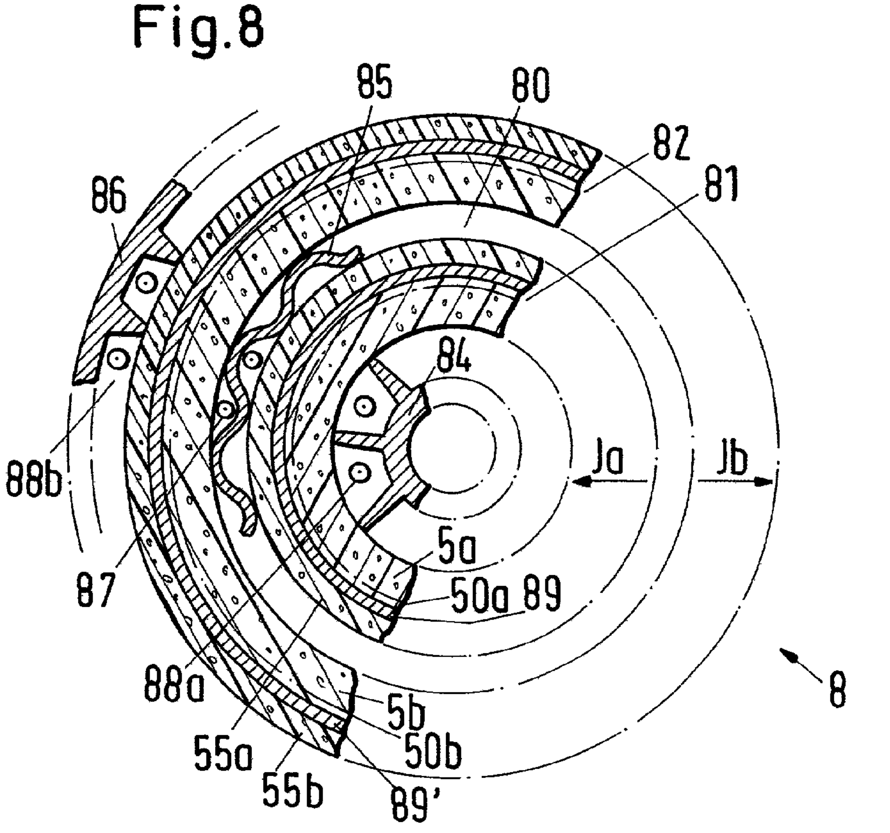
FIG. 8 is a cross-section through a fuel cell including two concentric tubes.

FIG. 8 shows a cross-section through a fuel cell 8 which comprises two electrochemically active elements in the form of concentric tubes 81 and 82. A first gas flow 87 with reducing reactants is guided in an annular gap 80 between the two tubes 81, 82. A second gas flow, which includes molecular oxygen and which is formed from two branch flows 88*a* and 88*b*, is led over the inner surface of the tube 81 or over the outer surface of the tube 82 respectively. Metallic conductors 84, 85 and 86 serve as collectors.

The tubes 81 and 82 are electrochemically active elements, each with a respective layer substructure 5*a* or 5*b* according to the invention. Such an element forms a multi-layer system which comprises an anode layer, a gas tight solid electrolyte layer and a cathode layer. The electrode layers, that is, either the anode or the cathode layer, are applied to the edge zone 50 of the substructure 5*a* or 5*b* respectively; or the edge zones 50 themselves have the function of electrode layers. In the event that an additional electrode layer is applied to the edge zone 50, it is advantageous if the substructure 5*a* or 5*b* is substantially made of the same substance mixture as the electrode layer. In the inner tube 81, the substructure 5*a* of the invention is formed as a cathode on which a solid electrolyte layer 89 is applied, and an anode layer 55*a* on this; in the outer tube 82, the substructure 5*b* of the invention is formed as an anode on which a solid electrolyte layer 89' is applied, and an cathode layer 55*b* on this. The arrows Ja and Jb indicate the directions of the electric currents which are produced in the fuel cell 8.

A high temperature fuel cell having planar cells is disclosed in the above-mentioned EP-A-0 788 175. The electrochemically active elements of these cells can likewise be made with the layer substructure of the invention, with molds being used in accordance with FIGS. 2 and 3.

Figure 9:
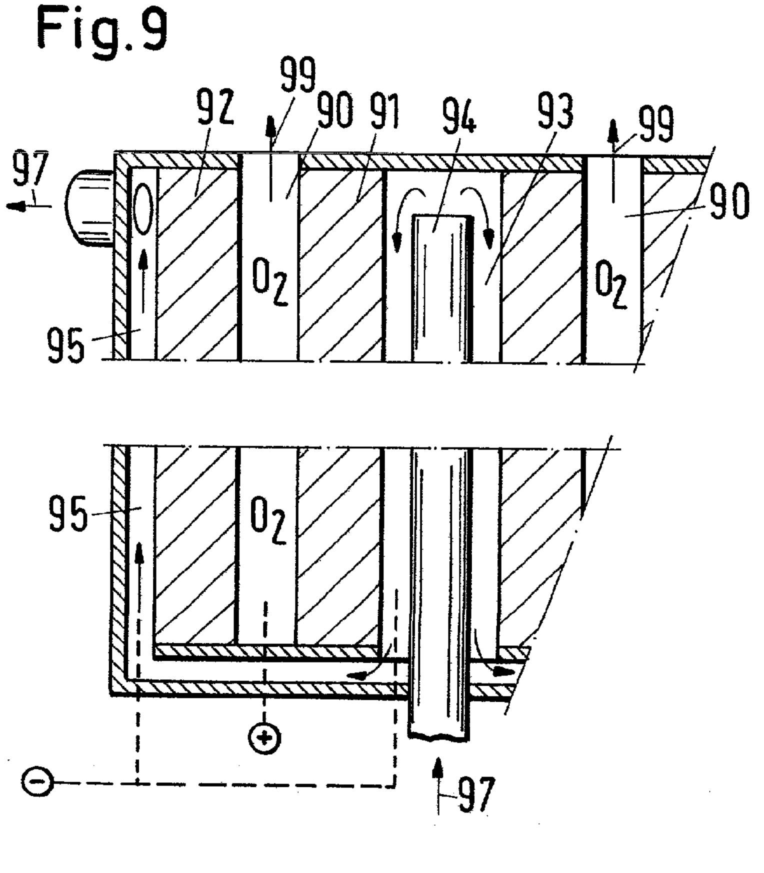
FIG. 9 is a longitudinal section through an oxygen generator which has substantially the same design as the fuel cell of FIG. 8.

FIG. 9 shows a longitudinal section through an oxygen generator 9 which has substantially the same design as the fuel cell 8 of FIG. 8 and which also works at high temperatures. The oxygen generator 9 comprises two electrochemically active elements 91, 92 and annular gap spaces 90, 93 and 95, in which collectors (not shown)—corresponding to the collectors 84, 85 and 86 in FIG. 8—are arranged. Heated air 97 is fed into the inner annular gap space 93 via a central tube 94 and further guided from there into the outer annular gap space 95. An electric potential is applied (indicated by plus and minus terminals) between the annular gap space 90 and the annular gap spaces 93 and 95. Oxygen ions are transported through the solid electrolyte layers of the two elements 91 and 92, discharged in the annular gap space 90 and released as molecular oxygen. Pure oxygen $O_2$ (arrow 99) can thus be gained from air 97 in the annular gap space 90.

The layer substructure of the invention can also be used, in addition to fuel cells and oxygen generators, as functional components for a high temperature electrolysis apparatus in which hydrogen and oxygen are generated electrolytically from water vapor.

The structure illustrated in FIG. 5, and to be understood as an example, has been made with a slurry whose composition is suitable for the manufacture of an anode substructure and which is characterized by the following formula:

175 g nickel oxide NiO, whose particles have a mean diameter $d_{50}$ of 3 μm (50% by weight of the particles have a diameter which is smaller than $d_{50}$).

75 g zirconium oxide $ZrO_2$ which is stabilized with yttrium Y (YSZ); $d_{50}$ around 0.6 μm.

20 g water.

3 g dispersing agent which is already used in known ceramic processing methods (a polycarbonic acid with the brand name "Dispex A40" of the company of Prochem AG).

50 g binding agent (polyvinyl acetate "Vinapas®" EZ W 36).

10 g pore forming material in the form of cellulose (from deal, fiber length 20-150 μm.

Slurry preparation: water, dispersing agent, NiO and YSZ powder are crushed and dispersed on a ball mill with zirconium oxide milling balls (diameter 20 mm, weight ratio to milling material 2:1) for 16 hours. The cellulose fibers are subsequently added and dispersed for a further two hours. Finally, the binding agent is added and homogenised for two hours.

When used as an anode, the nickel oxide is reduced to nickel; the porosity increases in this process.

When a cathode layer is being made, a mixture is used for the sinterable particles which comprises a perovskite (e.g. $La_xSr_{1-x}MnO_3$) and YSZ (around 50% by weight each).

In addition to cellulose fibers, graphite platelets, synthetic resin balls or a mixture of all three or two each of the above substances can be used as pore forming materials. Preferably, however, cellulose fibers and/or a mixture of cellulose fibers and synthetic resin balls can be used.

In a so-called ASE cell (anode supported electrolyte cell), the carrier structure is located at the side of the reducing fuel gas ($H_2$, CO), i.e. at the anode side. In the manufacture of the ASE cell, the functional layers are applied onto the layer substructure of the invention by a coating method in the order of anode, electrolyte and cathode. This multi-layer plate has a periphery which is exposed to an environment containing molecular oxygen during a current producing operation of the fuel cell. The material of the porous layer substructure, which consists largely of nickel, has the property that it adopts an oxidized or a reduced state depending on the environment at the operating temperature of the fuel cell. The periphery of the multi-layer plate must therefore be provided with a barrier which inhibits or prevents the transport of molecular oxygen from the surrounding environment into the layer substructure. Otherwise, the ASE cell, whose layer substructure is in the reduced state during operation, is changed by a topical oxidation in the edge region of the periphery such that damaging cracks occur. The layer substructure, which is manufactured by means of the mold shown in FIG. 3, is advantageously also given a compacted zone at its periphery with the method of the invention. This zone, which extends over the whole height of the layer substructure, has the advantage that it represents a barrier against the transport of molecular oxygen. The pores still present can be sealed with an additional means.

The invention claimed is:

1. A porous, gas permeable homogeneous substructure comprising a carrier structure and a compacted edge zone including pores and defining a smooth surface, the compacted edge zone extending over substantially an entire carrier surface of the carrier structure, the edge zone and the carrier structure both having been sintered from a uniform substance mixture including sinterable particles, the carrier structure having a porosity which is greater than 30 volume percent, the compacted edge zone having a porosity that is less than 30 volume percent, and the pores of the edge zone being smaller than 10 μm, wherein the porous, gas permeable homogeneous substructure is operable as a carrier for an electrode layer of a fuel cell.

2. A substructure in accordance with claim 1 wherein a thickness of the edge zone is smaller than 100 μm.

3. A substructure in accordance with claim 1 wherein the edge zone and the carrier structure are shaped into one of a plate shape and a tube.

4. A substructure in accordance with claim 3 wherein the edge zone defines an outer surface of the tube.

5. An electrochemically active element comprising a porous, gas permeable homogeneous substructure including a carrier structure and a compacted edge zone including pores and defining a smooth surface, the compacted edge zone extending over substantially an entire carrier surface of the carrier structure, the edge zone and a carrier structure both having been sintered from a uniform substance mixture including sinterable particles, the carrier structure having a porosity which is greater than 30 volume percent, the compacted edge zone having a porosity that is less than 30 volume percent, and the pores of the edge zone being smaller than 10 μm, and a multi-layer system including an anode layer, a gas impervious solid electrolyte layer and a cathode layer, the anode layer or the cathode layer being formed by or applied to the compacted edge zone of the substructure, the multi-layer system being operable for use in a fuel cell.

6. An electrochemically active element in accordance with claim 5, wherein the layer applied to the edge zone substantially consists of the same substance mixture as the substructure.

7. A porous, gas permeable substructure comprising a carrier structure and a compacted edge zone including pores and defining a smooth surface, the compacted edge zone extending over substantially an entire carrier surface of the carrier structure, the carrier structure and the edge zone both having been sintered from a common substance mixture including sintered particles and defining a one-piece, homogeneous substructure, the carrier structure having a porosity which is greater than 30 volume percent, the compacted edge zone having a porosity that is less than 30 volume percent, and the edge zone having pores which are smaller than 10 μm, wherein the porous, gas permeable homogeneous substructure is operable as a carrier for an electrode layer of a fuel cell.

8. A method for the manufacture of a porous, gas permeable, homogeneous substructure comprising preparing a first slurry from a powder mixture and a liquid, pouring the first slurry onto a mold which is absorbent with respect to the liquid, and solidifying the slurry to form a uniformly thick layer so that the uniformly thick layer defines a carrier structure and a compacted edge zone including pores and defining a smooth surface, the edge zone and a carrier structure being made from a uniform substance mixture including sinterable particles, the carrier structure having a porosity which is greater than 30 volume percent, and the pores of the edge zone being smaller than 10 μm.

9. A method in accordance with claim 8 including preparing a second slurry, applying the second slurry to the uniformly thick layer and drying the second slurry to produce an intermediate product, removing the intermediate product from the mold, and sintering the intermediate product.

10. A method in accordance with claim 9 including preparing at least one of the slurries by mixing a powdery mixture of sinterable particles and organic components as pore forming materials and binding agents which go into a volatile form during sintering, and a liquid which comprises primarily water, and forming a suspension medium for the powdery mixture and at least one additive.

11. A method in accordance with claim 8 including making the absorbent mold of gypsum or an apparatus which comprises an extraction device including an inserted micro-filter film.

12. A method in accordance with claim 10 wherein the organic components comprise at least one of cellulose fibers, graphite platelets and synthetic resin balls.

13. A method in accordance with claim 8 including vibrating the mold during the pouring of the slurry.

* * * * *

UNITED STATES PATENT AND TRADEMARK OFFICE

CERTIFICATE OF CORRECTION

PATENT NO. : 7,638,222 B2
APPLICATION NO. : 10/059878
DATED : December 29, 2009
INVENTOR(S) : Kaiser et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1217 days.

Signed and Sealed this

Ninth Day of November, 2010

David J. Kappos

*Director of the United States Patent and Trademark Office*